US012432774B2

(12) United States Patent
Ye et al.

(10) Patent No.: US 12,432,774 B2
(45) Date of Patent: Sep. 30, 2025

(54) INTER-DEVICE COMMUNICATION

(71) Applicant: Apple Inc., Cupertino, CA (US)

(72) Inventors: Chunxuan Ye, San Diego, CA (US);
Dawei Zhang, Saratoga, CA (US);
Haitong Sun, Cupertino, CA (US);
Hong He, San Jose, CA (US); Huaning Niu, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US)

(73) Assignee: Apple Inc., Cupertino, CA (US)

(*) Notice: Subject to any disclaimer, the term of this patent is extended or adjusted under 35 U.S.C. 154(b) by 402 days.

(21) Appl. No.: 17/901,022

(22) Filed: Sep. 1, 2022

(65) Prior Publication Data

US 2023/0141742 A1    May 11, 2023

Related U.S. Application Data

(60) Provisional application No. 63/276,248, filed on Nov. 5, 2021.

(51) Int. Cl.
*H04W 74/08* (2024.01)
*H04W 72/04* (2023.01)
(Continued)

(52) U.S. Cl.
CPC ... *H04W 74/0808* (2013.01); *H04W 72/0446* (2013.01); *H04W 74/0825* (2013.01); *H04W 74/0841* (2013.01); *H04W 76/14* (2018.02)

(58) Field of Classification Search
CPC ......... H04W 74/0808; H04W 72/0446; H04W 74/0825; H04W 74/0841; H04W 76/14; H04W 72/25; H04W 72/40
See application file for complete search history.

(56) References Cited

U.S. PATENT DOCUMENTS

| 2020/0068609 A1* | 2/2020 | Wang | H04W 72/02 |
| 2021/0105817 A1* | 4/2021 | Nguyen | H04W 74/0816 |

(Continued)

OTHER PUBLICATIONS

Apple, "On Sidelink Resource Allocation for Power Saving," 3GPP TSG RAN WG1 #106b-e, R1-2110053, Oct. 11-19, 2021, 14 pages.

(Continued)

*Primary Examiner* — Luat Phung
(74) *Attorney, Agent, or Firm* — Fish & Richardson P.C.

(57) ABSTRACT

Methods, systems, and apparatus, including computer programs encoded on computer storage media, for communications between user equipment. One of the methods includes receiving, by a first device and from a second device, sidelink control information indicating a resource reservation for a single-slot resource for the second device to use to communicate with the first device; determining, by the first device and based at least in part on the sidelink control information, whether a potential resource collision exists when the first device is scheduled to communicate with another device using the single-slot resource or when the single-slot resource is reserved by another device; and in response to determining that the potential resource collision exists, sending, by the first device and within a predetermined number of slots from a reference slot, a collision message to cause the second device to determine another single-slot resource to use to communicate with the first device.

20 Claims, 10 Drawing Sheets

(51) Int. Cl.
*H04W 72/0446* (2023.01)
*H04W 74/0808* (2024.01)
*H04W 74/0833* (2024.01)
*H04W 76/14* (2018.01)

(56) References Cited

U.S. PATENT DOCUMENTS

| | | | | |
|---|---|---|---|---|
| 2022/0030575 A1* | 1/2022 | Farag | ................... | H04L 5/0053 |
| 2022/0095280 A1* | 3/2022 | Farag | ................... | H04W 28/26 |
| 2022/0312479 A1* | 9/2022 | Farag | ................... | H04W 72/542 |
| 2023/0092224 A1* | 3/2023 | Mohammad Soleymani | ................ | H04W 72/56 370/329 |
| 2023/0107863 A1* | 4/2023 | Farag | ................... | H04W 72/542 370/329 |
| 2023/0143434 A1 | 5/2023 | Ye et al. | | |
| 2023/0143570 A1 | 5/2023 | Ye et al. | | |
| 2023/0224871 A1* | 7/2023 | Ding | ................... | H04W 72/40 370/329 |
| 2023/0371070 A1* | 11/2023 | Lin | ................... | H04W 72/0446 |
| 2023/0379912 A1* | 11/2023 | Ji | ................... | H04W 72/20 |
| 2024/0134715 A1* | 4/2024 | Ding | ................... | H04W 52/028 |
| 2024/0163918 A1* | 5/2024 | Miao | ................... | H04W 72/02 |
| 2024/0172184 A1* | 5/2024 | Lin | ................... | H04W 72/02 |
| 2024/0276521 A1* | 8/2024 | Ding | ................... | H04L 5/0051 |
| 2024/0323978 A1* | 9/2024 | Ko | ................... | H04W 72/40 |
| 2024/0340959 A1* | 10/2024 | Deng | ................... | H04W 74/002 |
| 2024/0349311 A1* | 10/2024 | Sun | ................... | H04W 72/40 |

OTHER PUBLICATIONS

International Search Report and Written Opinion in International Appln. No. PCT/US2022/048601, mailed on Feb. 9, 2023, 15 pages.

[Unknown Author], "3rd Generation Partnership Project; Technical Specification Group Radio Access Network; NR; Multiplexing and channel coding (Release 16)," 3GPP TS 38.212 V16.7.0, Sep. 2021, 153 pages.

[Unknown Author], "3rd Generation Partnership Project; Technical Specification Group Radio Access Network; NR; Physical channels and modulation (Release 16)," 3GPP TS 38.211 V16.7.0, Sep. 2021, 134 pages.

[Unknown Author], "3rd Generation Partnership Project; Technical Specification Group Radio Access Network; NR; Physical layer procedures for control (Release 16)," 3GPP TS 38.213 v16.7.0, Sep. 2021, 188 pages.

[Unknown Author], "3rd Generation Partnership Project; Technical Specification Group Radio Access Network; NR; Physical layer procedures for data (Release 16)," 3GPP TS 38.214 v16.7.0, Sep. 2021, 172 pages.

[Unknown Author], "3rd Generation Partnership Project; Technical Specification Group Radio Access Network; NR; Radio Resource Control (RRC) protocol specification (Release 16)," 3GPP TS 38.331 V16.6.0, Sep. 2021, 961 pages.

* cited by examiner

600

```
┌─────────────────────────────────────┐
│ Determine, by a first device, a time window │
│ that includes a plurality of time slots that can │
│ be used to determine a time slot for │
│ communication with another device using a │
│ single-slot resource on a sidelink │
│ communication channel │
│                                 602 │
└─────────────────────────────────────┘
                  ↓
┌─────────────────────────────────────┐
│ Determine a first offset and a second offset │
│ that identify the time window with respect to a │
│ reference time slot │
│                                 604 │
└─────────────────────────────────────┘
                  ↓
┌─────────────────────────────────────┐
│ Send, during the reference time slot, a │
│ message that i) identifies the first offset and │
│ the second offset that identify the time │
│ window and ii) includes a request for a │
│ second device to respond with an │
│ identification of one or more time slots in the │
│ time window for the single-slot resource │
│                                 606 │
└─────────────────────────────────────┘
```

FIG. 6

INTER-DEVICE COMMUNICATION

CROSS-REFERENCE TO RELATED APPLICATIONS

This application claims priority to U.S. Application No. 63/276,248, filed on Nov. 5, 2021, which is hereby incorporated by reference in its entirety.

BACKGROUND

User equipment, e.g., a mobile device such as a cellular phone or a tablet or a vehicle, can use a resources for communications with other devices. For instance, the user equipment can use sidelink transmissions to communicate with outer user equipment. The data transmission can include receiving data, e.g., using a sidelink, sending data, e.g., using a sidelink.

SUMMARY

In general, one aspect of the subject matter described in this specification can be embodied in methods that include the actions of receiving, by a first device and from a second device, sidelink control information that indicates a resource reservation for a single-slot resource for the second device to use to communicate with the first device; determining, by the first device and based at least in part on the sidelink control information, whether a potential resource collision exists when the first device is scheduled to communicate with another device using the single-slot resource or when the single-slot resource is reserved by another device; and in response to determining that the potential resource collision exists, sending, by the first device and within a predetermined number of slots from a reference slot, a collision message to cause the second device to determine another single-slot resource to use to communicate with the first device.

In general, one aspect of the subject matter described in this specification can be embodied in methods that include the actions of receiving, by a first device and from a second device, sidelink control information that indicates a resource reservation for a single-slot resource for the second device to use to communicate with the first device; after receiving the sidelink control information, determining, by the first device, a reference signal received power for a third device that has a reserved resource that is at least partially overlapping in time and frequency with the single-slot resource; determining, by the first device, whether the reference signal received power for the third device satisfies a reference signal received power threshold; and in response to determining that the reference signal received power for the third device satisfies the reference signal received power threshold, sending a collision message to cause the second device to determine another single-slot resource to use to communicate with the first device.

In general, one aspect of the subject matter described in this specification can be embodied in methods that include the actions of determining, by a first device, a time window that includes a plurality of time slots that can be used to determine a time slot for communication with another device using a single-slot resource on a sidelink communication channel; determining, by the first device, a first offset and a second offset that identify the time window with respect to a reference time slot; and sending, during the reference time slot and by the first device, a message i) to a second device and that ii) identifies the first offset and the second offset that identify the time window and iii) includes a request for the second device to respond with an identification of one or more time slots in the time window for the single-slot resource.

In general, one aspect of the subject matter described in this specification can be embodied in methods that include the actions of determining, by a first device and from a set of multiple candidate resources, one or more first preferred single-slot resources for communication with another device; receiving, by the first device and from a second device, a message that indicates one or more second preferred single-slot resources from the set of multiple candidate resources that the first device can use to communicate with the second device; determining one or more intersected single-slot resources that are each one of the one or more first preferred single-slot resources and one of the one or more first preferred single-slot resources; determining whether a quantity of the one or more intersected single-slot resources satisfies a quantity threshold; and in response to determining whether the quantity of the one or more intersected single-slot resources satisfies the quantity threshold, selectively reporting, to a higher layer of the first device, a) the one or more intersected single-slot resources or b) the one or more intersected single-slot resources and a set of resources from the one or more first preferred single-slot resources.

In general, one aspect of the subject matter described in this specification can be embodied in methods that include the actions of receiving, by a first device and from a second device, a message that indicates one or more non-preferred single-slot resources that the first device should not use to communicate with the second device; determining a proper-subset of candidate resources by excluding the one or more non-preferred single-slot resources from a set of multiple candidate resources; determining, from the proper-subset of candidate resources, one or more preferred resources; determining whether the first device received a message that indicated non-preferred single-slot resources; in response to determining that the first device received the message that indicated non-preferred single slot resources, determining a quantity threshold using either a non-preferred percentage or a number of resources in the proper-subset of candidate resources or both; determining whether a quantity of the one or more preferred resources satisfies the quantity threshold; and in response to determining whether the quantity of the one or more preferred resources satisfies the quantity threshold, selectively reporting the one or more preferred resources to a higher layer of the first device or increasing a decibel level for a priority value for use sensing one or more other preferred resources. The non-preferred percentage can be a different percentage than a percentage used when the first device does not receive a message that indicated non-preferred single-slot resources.

In general, one aspect of the subject matter described in this specification can be embodied in methods that include the actions of determining, by a first device, a set of candidate slots using periodic-based partial sensing; determining, by the first device during a first slot, to transmit data aperiodically to a second device; determining whether a gap between the first slot and a start of the set of candidate slots satisfies a first slot gap threshold that indicates a first number of slots; and in response to determining that the gap satisfies the first slot gap threshold: determining, by the first device, a contiguous partial sensing window with i) a starting slot that is at least the first number of slots before the start of the set of candidate slots and ii) an ending slot that is at least a second slot gap threshold before the start of the set of candidate slots, the second slot gap threshold indicating a second number of slots; and determining, by the first device using contiguous partial sensing in the contiguous partial sensing window, a subset of slots from the set of candidate slots to use to transmit the data aperiodically to the second device.

In general, one aspect of the subject matter described in this specification can be embodied in methods that include the actions of determining, by a first device, a first set of candidate slots using periodic-based partial sensing; determining, by the first device during a first slot, to transmit data aperiodically to a second device; determining whether a gap between the first slot and a start of the first set of candidate slots satisfies a first slot gap threshold; and in response to determining that the gap does not satisfy the first slot gap threshold: determining, by the first device, a contiguous partial sensing window with i) a starting slot that is a first predetermined number of slots from the first slot and ii) an ending slot that is at most a second predetermined number of slots from the first slot; and determining, by the first device using contiguous partial sensing in the contiguous partial sensing window, a second set of candidate slots to use to transmit the data aperiodically to the second device.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Sending the collision message can include sending, within the predetermined number of slots from a slot in which the first device received the sidelink control information, the collision message. Sending the collision message can include sending, within the predetermined number of slots from a slot in which a potential resource collision exists according to the received sidelink control information, the collision message.

In some implementations, the method can include receiving resource pool configuration data or pre-configuration data that identifies the reference slot. Sending the collision message can include sending an inter-device coordination message. The predetermined number of slots can be three or fewer slots. Sending the collision message can include sending, within three or fewer slots from the reference slot, the collision message to cause the second device to determine another single-slot resource to use to communicate with the first device.

In some implementations, the method can include receiving, by the first device and from a third device, a second sidelink control information that indicates a second resource reservation for a second single-slot resource for the third device to use to communicate with the first device; after receiving the second sidelink control information, determining, by the first device, whether a potential resource collision exists when the first device is scheduled to communicate with another device using the second single-slot resource; and in response to determining that a potential resource collision does not exist, determining, by the first device and within a predetermined number of slots from a reference slot, to skip sending a collision message. The second device can be the third device.

In some implementations, the reference signal received power threshold can be a second reference signal received power for the second device. The method can include determining the second reference signal received power for the second device before determining whether the reference signal received power for the third device satisfies the reference signal received power for the second device. Determining whether the reference signal received power for the third device satisfies the reference signal received power for the second device can include determining whether the reference signal received power for the third device is within a power level threshold of the reference signal received power for the second device.

In some implementations, the reference signal received power threshold can be a predetermined reference signal received power threshold. The method can include receiving resource pool configuration data or pre-configuration data that identifies the reference signal received power threshold. Receiving the sidelink control information can include receiving the sidelink control information that identifies the reference signal received power threshold. Determining whether the reference signal received power for the third device satisfies the reference signal received power threshold can include determining whether the reference signal received power for the third device is greater than, equal to, or greater than or equal to, the reference signal received power threshold.

In some implementations, the method can include, after sending the message, receiving, by the first device and from the second device, a response that identifies the one or more time slots for the single-slot resource that the second device determined using the first offset, the second offset, and data for the reference time slot. The method can include using, by the first device, one of the one or more time slots identified in the response to determine the single-slot resource to communicate with the other device.

In some implementations, determining the time window can include determining the time window that includes a plurality of preferred resources from which the second device can select one or more resources that i) each have a corresponding time slot and a corresponding sub-channel index and ii) can be used to determine the single-slot resource. Sending the message can include sending the message that includes the request for the second device to respond with an identification of the one or more resources selected from the plurality of preferred resources for the single-slot resource.

In some implementations, determining the time window can include determining the time window that includes a plurality of non-preferred resources from which the second device should not select one or more resources that i) each have a corresponding time slot and a corresponding sub-channel index and ii) can be used to determine the single-slot resource. Sending the message can include sending the message that includes the request for the second device to respond with an identification of the one or more resources, for the single-slot resource, selected from multiple resources that do not include the plurality of non-preferred resources.

In some implementations, the method can include determining the set of resources from the one or more first preferred single-slot resources. Determining the set of resources can include determining the set of resources from the one or more first preferred single-slot resources that excludes the one or more intersected single-slot resources.

The method can include configuring the quantity threshold per resource pool. The method can include configuring the quantity threshold using a data priority.

In some implementations, selectively reporting can include, in response to determining that the quantity of the one or more intersected single-slot resources does not satisfy the quantity threshold, selectively reporting, to the higher layer of the first device, the one or more intersected single-slot resources and a set of resources from the one or more first preferred single-slot resources. The method can include, after selectively reporting: selecting, by the higher layer of the first device, the one or more intersected single-slot resources for communication with the second device; and randomly selecting, by the higher layer of the first device, a quantity of resources from the set of resources for communication with the second device. Selectively reporting can include, in response to determining that the quantity of the one or more intersected single-slot resources satisfies the quantity threshold, selectively reporting, to the higher layer of the first device, the one or more intersected single-slot resources.

In some implementations, the method can include randomly selecting, by the higher layer of the first device and after selectively reporting, a quantity of resources from the one or more intersected single-slot resources for communication with the second device. Receiving the message can include receiving an inter-device coordination message.

In some implementations, selectively reporting the one or more preferred resources to the higher layer of the first device or increasing the decibel level can include, in response to determining that the quantity of the one or more preferred resources satisfies the quantity threshold, reporting the one or more preferred resources to the higher layer of the first device. Selectively reporting the one or more preferred resources to the higher layer of the first device or increasing the decibel level can include, in response to determining that the quantity of the one or more preferred resources does not satisfy the quantity threshold, increasing the decibel level for a priority value for use sensing one or more other preferred resources.

In some implementations, determining the proper-subset of candidate resources can include excluding any candidate single-slot resource from the set of multiple candidate resources that a) a reference signal received power for a sidelink control information is higher than a threshold value, and b) are periodically reserved by another device within a resource selection window. Determining, from the proper-subset of candidate resources, one or more preferred resources can include sensing, from the set of multiple candidate resources, one or more first preferred resources; and determining the one or more preferred resources by excluding, from the one or more first preferred resources, each of the one or more non-preferred single-slot resources.

In some implementations, the first slot gap threshold can be greater than the second slot gap threshold. Determining the set of candidate slots can occur before determining to transmit the data aperiodically to the second device. The set of candidate slots can be contiguous. The method can include determining the second slot gap threshold using a contiguous partial sensing result processing time and a sidelink transmission preparation time.

In some implementations, the method can include aperiodically transmitting, by the second device and to the first device, the data over a slot from the subset of slots. The method can include determining whether a quantity of slots in the set of candidate slots satisfies a quantity threshold. Determining the contiguous partial sensing window can be responsive to determining that the quantity of slots satisfies the quantity threshold and that the gap satisfies the first slot gap threshold. Determining the contiguous partial sensing window can include determining the contiguous partial sensing window with the starting slot that is the first slot gap threshold before the start of the set of candidate slots.

In some implementations, the method can include determining whether a quantity of slots in the first set of candidate slots satisfies a quantity threshold. Determining the contiguous partial sensing window can be responsive to determining that the quantity of slots does not satisfy the quantity threshold and that the gap does not satisfy the first slot gap threshold. The first predetermined number of slots can be one. The second predetermined number of slots can be less than or equal to thirty-two.

In some implementations, the method can include aperiodically transmitting, by the second device and to the first device, the data over a slot from the second set of candidate slots. The method can include determining the second predetermined number of slots using a contiguous partial sensing result processing time and a sidelink transmission preparation time. Determining the second predetermined number of slots can include determining the second predetermined number of slots with a distance between the starting slot and the ending slot that is at most two minutes.

The subject matter described in this specification can be implemented in various embodiments and may result in one or more of the following advantages. The systems and methods described in this specification can reduce a likelihood of device, e.g., user equipment, resource collisions. The systems and methods described in this specification can improve selection of preferred and non-preferred resources for use in transmissions between devices, e.g., user equipment. The systems and methods described in this specification can improve candidate resource selection, reliability, or both, by reusing periodic-based partial sensing candidates for aperiodic transmissions. The systems and methods described in this specification can reduce the power consumption by performing partial sensing, e.g., using contiguous partial sensing for an aperiodic communication.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram of an example process for sending a time window message.

Like reference numbers and designations in the various drawings indicate like elements.

DETAILED DESCRIPTION

Figure 1:
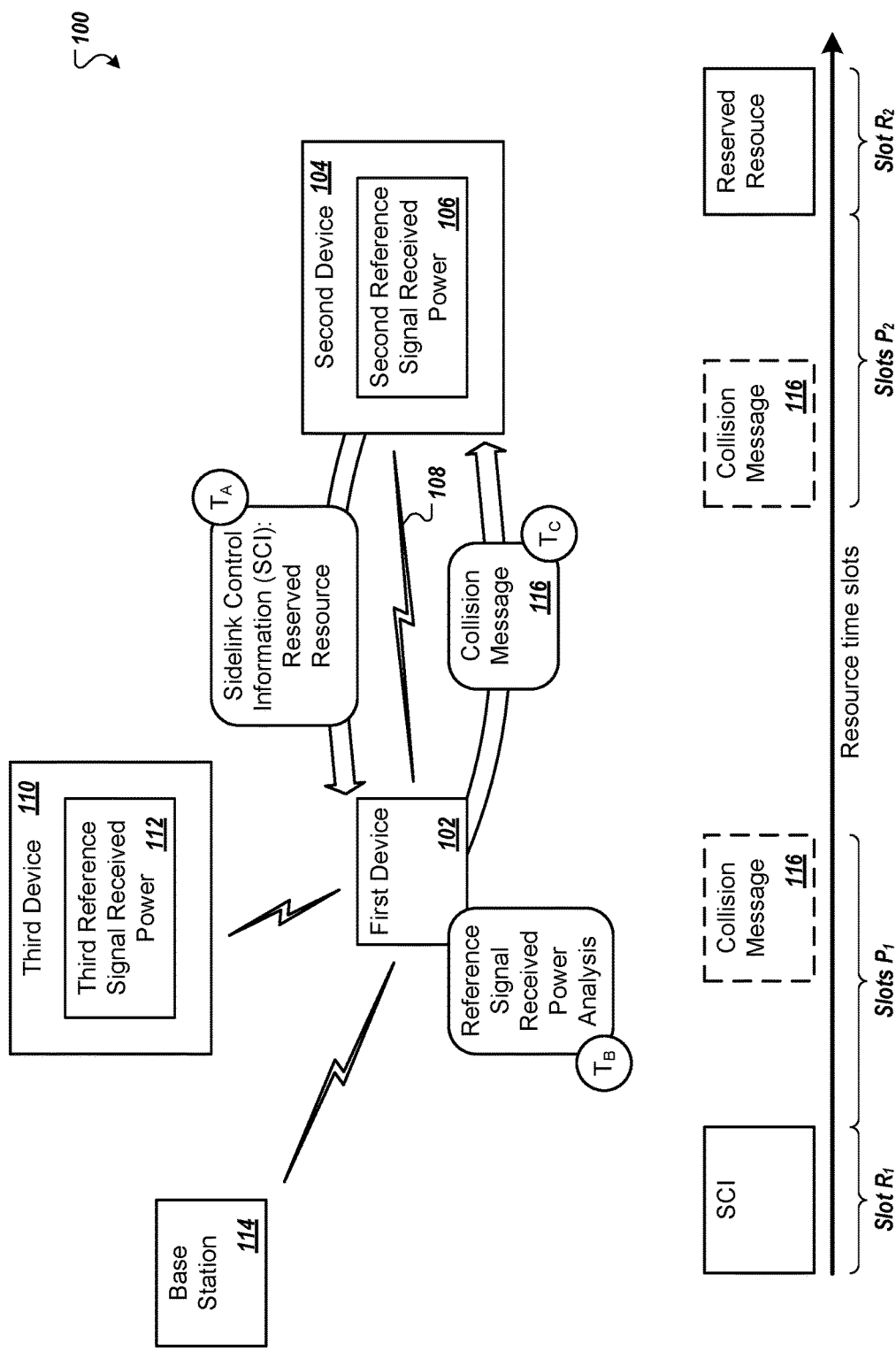
FIG. 1 depicts an example environment in which a first device communicates with a second device using a sidelink channel.

Devices can use various protocols to communicate with each other. For instance, first user equipment, e.g., a smart phone, can use a cellular connection that includes a base station to communicate with second user equipment, e.g., another smart phone.

Sometimes a device can communicate directly with another device without the use of a base station. For instance, the device can use a sidelink channel to transmit data to or receive data from the other device, e.g., to communicate with the other device.

To communicate on a sidelink channel, the two devices need to select a resource, in time and frequency, with which to communicate. If one device selects a less ideal resource, a collision can occur. For instance, a collision can occur when a different device selects the same resource for communication, when a reference signal received power for the different device satisfies a threshold such that it would cause interference when the two devices attempt to communicate, or both.

To reduce a likelihood of collisions, a device that receives a resource reservation request from a second device can determine whether a collision is likely to occur. The device can make this determination within a predetermined number of slots after receiving the request, within a predetermined number of slots of the identified resource, or both. The device can make this determination using a reference signal received power of another device, e.g., within a threshold distance of the device, a reference signal received power of the second device, or both. The device can then use a result of the collision likelihood determination to indicate whether the second device should select another resource for communications with the first device.

In some implementations, two devices can communicate to select a set of preferred resources. The preferred resources can be resources for which there is a lower likelihood of a collision. For instance, a first device can receive a list of resources from the second device, which list identifies either preferred or non-preferred resources. If the list identifies the second device's preferred resources, the first device can select its own preferred resources from the list of the second device's resources and use one of those resources to communicate with the second device.

If the list identifies the second device's non-preferred resources, the first device can determine its own preferred resources that do not include any of the second device's non-preferred resources. The two devices can then use one of the first device's preferred resources to communicate.

To indicate the list of preferred or non-preferred resources, the devices can use a time window. For instance, the second device can send the first device data that identifies the time window. The data can indicate a starting slot, an ending slot, or both, for the time window. The data can indicate whether the time window is for preferred or non-preferred resources.

To improve the reliability of the selected resources, a device that is creating a list of candidate resources, e.g., preferred resources, can determine whether to use periodic-based partial sensing ("PBPS") candidate resources for an aperiodic transmission. The device can use a number of the resources in the list of candidate resources, a number of slots before the start of the list of candidate resources, or both, to determine whether to use PBPS candidate resources. When one or more thresholds are satisfied, the device can use contiguous partial sensing ("CPS") along with PBPS. When any of the thresholds are not satisfied, the device can use CPS without PBPS.

FIG. 1 depicts an example environment 100 in which a first device 102 communicates with a second device 104 using a sidelink channel 108. The first device 102 can communicate with the second device 104 using a resource selected by one, or a combination of both, of the devices 102, 104. For instance, instead of having a base station 114 that assigns a resource for the first device 102 to use when communicating with the second device 104, the first device 102, the second device 104, or both, determine a resource to use for communications between the two devices 102, 104.

The second device 104 can determine a resource to use when communicating with the first device 102, e.g., for a sidelink transmission. The second device 104 can generate sidelink control information ("SCI") that identifies the resource. The second device 104 can, during slot TA, send the sidelink control information that identifies the resource to the first device 102.

The first device 102 receives the sidelink control information that identifies a reserved resource. The first device 102 can determine whether there is, or might be, a collision between the reserved resource and another resource that the first device 102 is scheduled to use to communicate with another device, e.g., the third device 110, or another resource that another device, e.g., the third device 110, is reserved to use. For example, the third device 110 can reserve the other resource for use communicating with a fourth device (not shown). The other resource that the other device is reserved to use can be a resource for a physical sidelink shared channel ("PSSCH").

For instance, during time period $T_B$, the first device 102 can determine whether a reference signal received power satisfies a power threshold. The reference signal received power can be for the third device 110, e.g., a third reference signal received power 112; for the second device, e.g., a second reference signal received power 106; or the first device can analyze both reference signal received powers 106, 112.

In some examples, the power threshold can be a predetermined threshold, e.g., for absolute interference. For instance, the first device 102 can use, as the power threshold, 8 decibel-milliwatts ("dBm"). The first device 102 can sense the third device's 110 third reference signal received power 112 using a sensor included in the first device 102. The first device 102 can compare the third reference signal received power 112 to the predetermined threshold, e.g., 8 dBm. When the third reference signal received power 112 satisfies the predetermined threshold, e.g., is greater than, equal to, or greater than or equal to, the first device 102 can determine that a collision is likely to occur. When the third reference signal received power does not satisfy the predetermined threshold, e.g., is less than, equal to, or less than or equal to, the first device can determine that a collision is not likely.

In some examples, the power threshold can be one of the two reference signal received powers 106, 112, e.g., for a relative interference. For instance, the first device 102 can sense, using a sensor, the second reference signal received power 106 and the third reference signal received power 112. The first device 102 can compare the two reference signal received powers 106, 112. When the third reference signal received power 112 satisfies the second reference signal received power 106, the first device 102 can determine that a collision is likely to occur. When the third reference signal received power 112 does not satisfy the second reference signal received power 106, the first device can determine that a collision is not likely.

The first device 102 can use the determination whether a collision is likely to determine whether to send a collision message 116. For instance, when the first device 102 determines that a collision is not likely the first device 102 can determine to skip sending a collision message 116 to the second device 104.

When the first device 102 determines that a collision is likely to occur, the first device 102 can send, during time period $T_C$, e.g., during slot $T_C$, a collision message 116 to the second device 104. The collision message 116 can indicate that a collision is likely to occur. In some implementations, the collision message 116 can be inter-device coordination information, e.g., inter-user equipment coordination information.

The first device 102 can determine the time period $T_C$ using any appropriate method. For instance, the first device 102 can determine to send the collision message 116 at most a first predetermined number of slots $P_1$ after the first device 102 received the sidelink control information ("SCI") during slot $R_1$. The first device 102 can determine to send the collision message 116 at most a second predetermined number of slots $P_2$ before a slot $R_2$ for the reserved resource. The first predetermined number $P_1$, the second predetermined number $P_2$, or both, can be at most three slots, e.g., two to three slots. By using the first predetermined number, the first device 102 can improve latency for the environment 100. By using the second predetermined number, the first device 102 can improve reliability, e.g., reduce the likelihood that a collision will not occur.

A body of the collision message 116 can include a value that indicates whether a collision will likely occur. For instance, the collision message 116 can include a bit that indicates whether a collision will likely occur. The bit can be in the body of the collision message 116. In some examples, the collision message 116 includes only a single bit that indicates whether a collision will likely occur.

The second device 104 receives the collision message 116. The second device 104 can use the collision message 116 to determine whether a collision will likely occur. For instance, the second device 104 can analyze the collision message 116 to determine the value of the bit. The second device 104 can use the value of the bit to determine whether a collision will likely occur. When the second device 104 determines that a collision will likely occur if the second device 104 uses the reserved resource to communicate with the first device 102, the second device 104 can reserve another resource for communications with the first device 102.

In some implementations, the first device 102 only sends the collision message 116 to the second device 104 when a collision will likely occur. In these implementations, when the first device 102 determines that a collision will not likely occur, the first device 102 can determine to skip sending the collision message 116 to the second device 104. The second device 104 can determine that a collision is not likely to occur when the second device 104 does not receive the collision message 116. For instance, the second device 104 can determine that the first predetermined number of slots $P_1$ or the second predetermined number of slots $P_2$ passed and that a collision is not likely to occur. When the second device 104 determines that a collision will not likely occur, the second device 104 can use the reserved resource to communicate with the first device 102.

The collision message can have any appropriate format. In some implementations, the collision message can have a physical sidelink feedback channel ("PSFCH") format, e.g., a PSFCH format 0 sequence. The collision message can be represented by a sequence of data. For instance, in a single physical resource block, there exist up to a predetermined number of cyclic shift pairs $N_{CS}$ of sequences, e.g., each cyclic shift pair of sequences represent a collision message and the number of cyclic shift pairs $N_{CS}$ can be 1, 2, 3, or 6. When a recipient device, e.g., the second device 104, receives a particular sequence in a particular physical resource block, the recipient device can determine that a collision will or is likely to occur.

The sending device, e.g., the first device, can generate the collision message, e.g., a sequence, using any appropriate process. For instance, the sending device can use $m_0$ and $m_{cs}$ to generate the sequence. In some examples, a value $m_{cs}$ can always be equal to 0. An initial cyclic shift $m_0$ can depend on $N_{CS}$. For instance, when $N_{CS}=1$, $m_0=\{0\}$; when $N_{CS}=2$, $m_0=\{0, 3\}$; when $N_{CS}=3$, $m_0=\{0, 2, 4\}$; and $N_{CS}=6$, $m_0=\{0, 1, 2, 3, 4, 5\}$.

The first device 102, the second device 104, or both, can determine whether to use the first predetermined number $P_1$ or the second predetermined number $P_2$ using any appropriate method. For instance, a resource pool configuration or pre-configuration can indicate whether to use the first or the second predetermined number. In some examples, data from the second device, e.g., sidelink control information, can indicate whether to use the first or the second predetermined number.

A resource pool is a set of time and frequency resources that can be used for sidelink communications, e.g., transmission, reception, or both. Devices that share a resource pool can know configuration data for the resource pool that indicates various configuration values for the resource pool. For instance, a device can know the configuration data when the device determines pre-configuration data that will be part of the configuration data, the device receives configuration data from the network, or both. These configuration values can include a value that identifies whether the devices that use the pool should use the first or the second predetermined number and the corresponding reference for the predetermined number, e.g., the sidelink control information slot $R_1$ or the reserved resource slot $R_2$.

The devices 102, 104, 110 can include personal computers, mobile communication devices, and other devices that can send and receive data over a sidelink channel. In some implementations, one or more of the devices 102, 104, 110 can send and receive data using a base station 114. For instance, one or more of the devices 102, 104, 110 can be smart phones, smart vehicles, or smart speakers.

Figure 2:
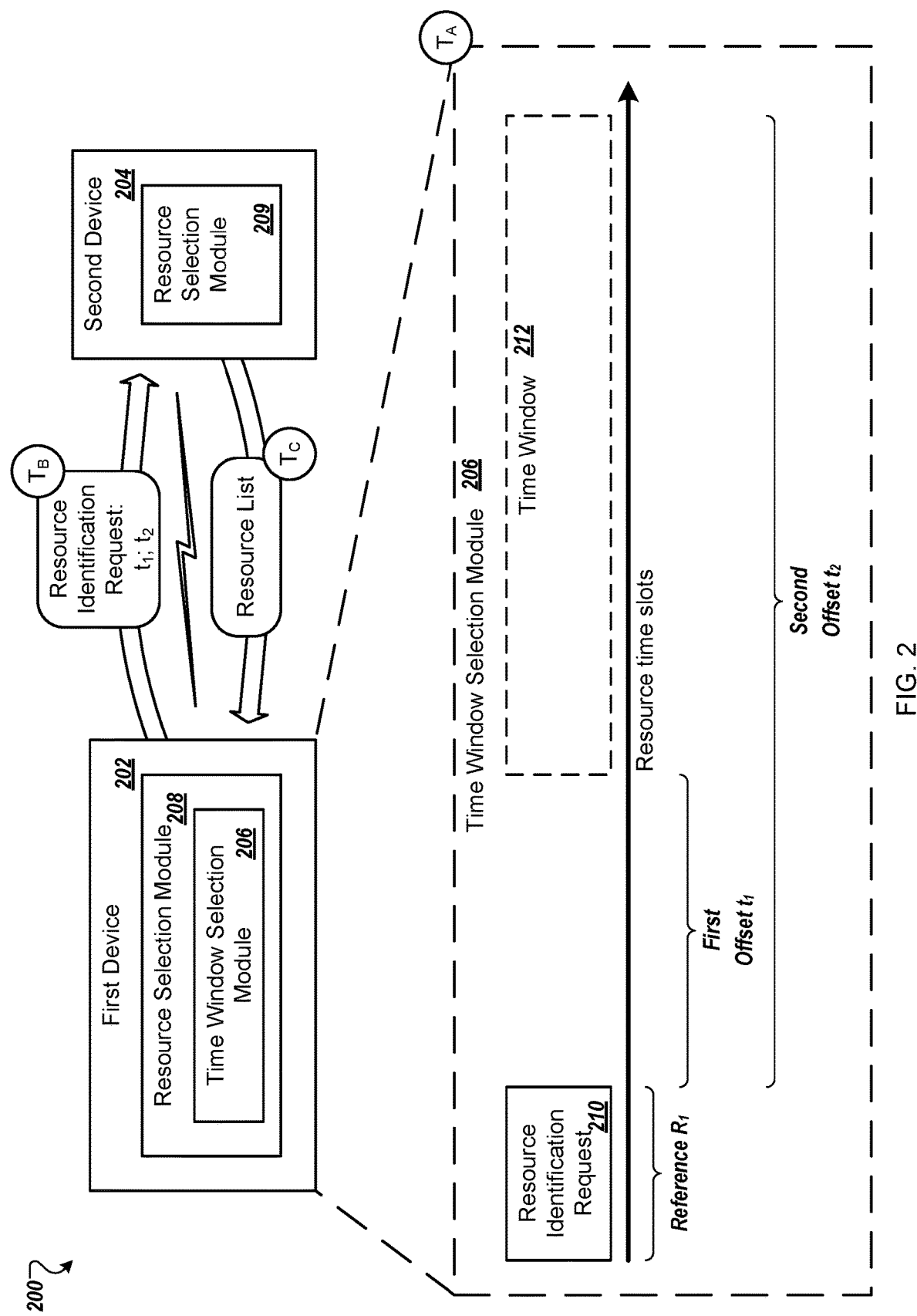
FIG. 2 depicts an example of an environment in which a first device, a second device, or both, can use preferred or non-preferred resources.

FIG. 2 depicts an example of an environment 200 in which a first device 202, a second device 204, or both, can use preferred or non-preferred resources. The devices 202, 204 can use the resources by identifying preferred or non-preferred resources available for communication. The devices 202, 204 can use one or more lists of preferred, non-preferred, or both, resources to select preferred resources for communicating with the other device.

For instance, the first device 202 can determine to request, from the second device 204, a list of one or more resources. The list of one or more resources can include a time window for the resources, e.g., when the resources are continuous, or a list of one or more discrete resources, e.g., resource slots. The request can indicate that the first device 202 wants to communicate, e.g., with another device, and needs to select a resource from a time window 212 to use for the communication. When the first device 202 receives a response from the second device 204, the first device 202 can use the response to select a resource to use for communication with the other device, whether or not the other device is the second device 204.

The first device 202 can use a time window selection module 206, e.g., included in a resource selection module 208, to determine the time window 212 during time period TA. The time window 212 can identify multiple slots from which the recipient device, e.g., the second device, will identify one or more resources.

Once the first device 202 determines the time window 212 for the list of one or more resources, the time window selection module 206 can determine a reference slot $R_1$ during which the first device 202 will send a message 210 to the second device 204. The message 210 can be a resource identification request, an inter-device coordination message, an inter-user equipment coordination message, or any other appropriate message.

The time window selection module 206 can determine, using the reference slot $R_1$, a first offset $t_1$ from the reference slot $R_1$ that indicates a number of slots after the reference slot $R_1$ when the time window 212 will start. The time window selection module 206 can determine, using the reference slot $R_1$, a second offset $t_2$ from the reference slot $R_1$ that indicates a number of slots after the reference slot $R_1$ when the time window 212 will end.

The first device 202 can send the message 210, e.g., the resource identification request, to the second device 204 during time period $T_B$, e.g., in the reference slot $R_1$. The message 210 can include the first offset $t_1$, and the second offset $t_2$. In some examples, the message 210 does not explicitly identify the reference slot $R_1$. Instead, the second device 204 can use the slot when it receives the message 210 as the reference slot $R_1$.

Upon receiving the message 210, e.g., the resource identification request, the second device 204 can identify one or more resources using the time window 212. The second device 204 can use any appropriate process to identify the resources. For instance, the second device 204 can have its own resource selection module 209, e.g., implemented on one or more processors, and can use its resource selection module 209 to select one or more resources or slots for the resources.

The resource selection module 209 can select the resources using the time window 212, e.g., the first offset $t_1$ and the second offset $t_2$ for the time window. For example, the resources selection module 209 can use the resource identification request 210 to determine the time window 212. The resource selection module 209 can receive data for the resource identification request 210 that indicates the reference slot $R_1$, the first offset the second offset $t_2$, or a combination of two or more of these. The resource selection module 209 can use the received data to determine the time window 212. The resource selection module 209 can then select one or more resources that have a time slot within the time window 212. The resource selection module 209 can select the one or more resources that each have a frequency, e.g., a sub-channel index.

The resources can be preferred resources, e.g., resources that the first device 202 can use to communicate with the other device, such as the second device 204. When the resources are preferred resources, the second device 204 can identify fewer than all preferred resources, e.g., up to a predetermined number of preferred resources.

The resources can be non-preferred resources, e.g., resources for which there will likely be a collision or that the second device 204 is scheduled to use for communication with another device. When the resources are non-preferred resources, the second device 204 can identify all of the non-preferred resources.

The second device 204 can determine whether to identify preferred or non-preferred resources for responding to the resource identification request. For instance, the second device 204 can determine whether a quantity of preferred resources, absent a predetermined maximum number of preferred resources, is greater than a quantity of non-preferred resources. If the quantity of preferred resources is greater, the second device 204 can determine to send, as the identified time resources, a list of the non-preferred resources. If the quantity of preferred resources is not greater, the second device 204 can determine to send, as the identified resources, a list of the preferred resources. In some examples, instead of comparing the quantity of non-preferred resources with the quantity of preferred resources, the second device 204 can compare the quantity of non-preferred resources with a predetermined maximum number of preferred resources.

Once the second device 204 identifies one or more resources, the second device 204 can respond to the first device 202 with a resource list during time period $T_C$, e.g., in a slot during time period $T_C$. The resource list includes identifiers for each of the resources, e.g., slots, the second device 204 identified. The identifiers can indicate a time, frequency, or both, for the corresponding resource. In some examples, the resource list can include data, e.g., a binary value, that indicates whether the resource list is a list of preferred resources or non-preferred resources. A first value for the binary value, e.g., one, can indicate that the resource list is a list of preferred resources. A second value for the binary value, e.g., zero, can indicate that the resource list is a list of non-preferred resources.

The first device 202 can receive the resource list and provide the resource list to the resource selection module 208. The resource selection module 208 can determine whether the resource list identifies preferred resources or non-preferred resources, e.g., using the binary value.

The resource selection module 208 can determine one or more first preferred resources of the first device 202 when the resource selection module 208 determines that the resource list identifies second preferred resources of the second device 204. The resource selection module 208 can then determine one or more intersection resources that are included in both the first preferred resources and the second preferred resources. When a quantity of resources in the one or more intersection resources satisfies a quantity threshold, e.g., is greater than, or equal to, or either, the resources selection module 208 can send data for the one or more intersection resources to a higher level in the second device 204.

For instance, the resource selection module 208 can be implemented in the physical layer of the first device 202. The resource selection module 208 can send the data that identifies the one or more intersection resources to a higher layer, above the physical layer, in the first device 202.

When the resource selection module 208 determines that the quantity of the intersection resources does not satisfy the quantity threshold, e.g., is less than or equal to or either, the resource selection module 208 can send first data for the one or more intersection resources and second data for one or more additional resources to the higher layer. The one or more additional resources can be resources included in the first preferred resources that are not included in the intersection resources, e.g., resources preferred by the first device 202 that are not also preferred by the second device 204.

The quantity threshold can a predetermined threshold. For instance, the quantity threshold can be configured or preconfigured per resources. In some examples, the quantity threshold can be dependent on data priority.

Upon receiving data for one or more resources, the first device's 202 higher layer can randomly select a predetermined number of resources. When the higher layer only receives data for the intersection resources, the higher layer can select the predetermined number of resources from the intersection resources, e.g., randomly. When the higher layer receives data for the intersection resources and one or more additional resources, the higher layer can select all of the intersection resources and randomly select remaining resources from the additional resources for a total selection of the predetermined number of resources.

When the resource selection module 208 determines that the resource list identifies non-preferred resources of the second device 204, the resource selection module 208 can determine one or more preferred resources of the first device 202. The resource selection module 208 excludes, from the one or more preferred resources, the second device's 204 non-preferred resources.

The resource selection module 208 determines a quantity of the remaining preferred resources after the exclusion of the non-preferred resources. The resource selection module 208 compares the quantity with a second threshold quantity. When the quantity satisfies the second threshold quantity, the resource selection module 208 sends data for the remaining preferred resources to a higher layer of the first device 202.

When the quantity does not satisfy the second threshold quantity, the resource selection module 208 can cause the first device 202 to increase a decibel level to use when sensing additional preferred resources, e.g., a decibel level for a priority value. The resource selection module 208 can then cause the first device 202 to sense additional preferred resources using the increased decibel level until the number of remaining preferred resources for the first device 202, after exclusion of the second device's 204 non-preferred resources, satisfies the second threshold quantity.

In some implementations, the resource selection module 208 can dynamically determine the second threshold quantity. For instance, the resource selection module 208 can use a first threshold quantity in response to receipt of a list of preferred resources and dynamically determine the second threshold quantity in response to receipt of a list of non-preferred resources.

The resource selection module 208 can determine the threshold quantities $T = X * M_{total}$. X can be a percentage. $M_{total}$ can be a number of resources in a resource selection window. When using a list of non-preferred resources, the resource selection module 208 can use a non-preferred resource percentage $X_{NP}$ that is a different, e.g., lower, percentage that a preferred resource percentage $X_P$. When using a list of preferred resources, the resource selection module 208 can use a number of resources $M_{total-P}$ for a pool of candidate resources that includes both the first device's 202 preferred resources and the second device's 204 preferred resources. When using a list of non-preferred resources, the resource selection module 208 can use a number of resources $M_{total-NP}$ for the pool of candidate resources excluding the first device's non-preferred resources. For instance, when using a list of non-preferred resources $S_{NP}$, the number of resources $M_{total-NP}$ can be equal to $M_{total-P} - |S_{NP}|$.

Although FIG. 2 depicts the time window selection module 206 as part of the resource selection module 208, the first device 202 can use any appropriate configuration for the time window selection module 206. For instance, the time window selection module 206 can be separate from or at least partially included in the resource selection module 208.

Figure 3:
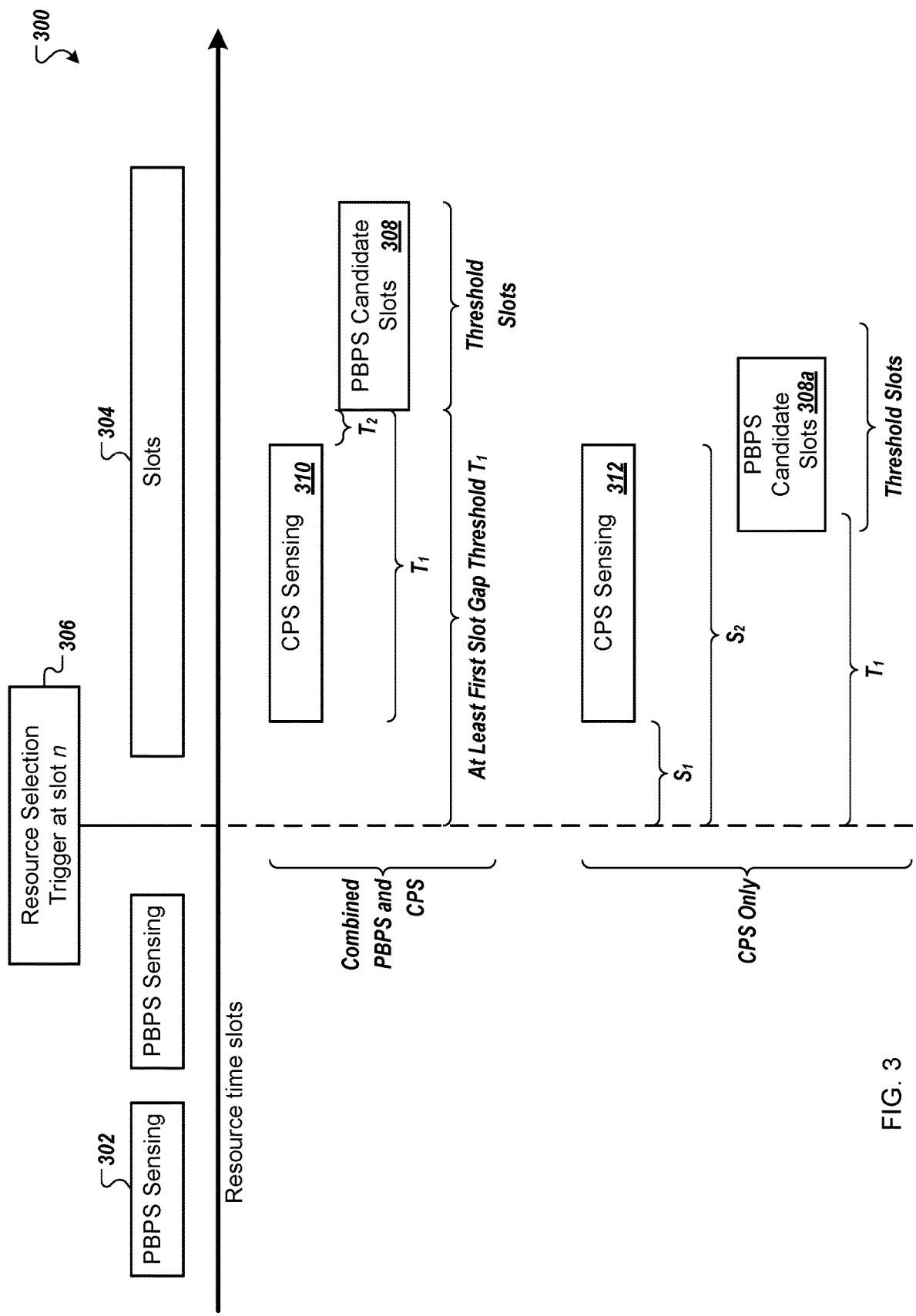
FIG. 3 depicts an example timeline for a device sensing candidate slots for communication with another device.

FIG. 3 depicts an example timeline 300 for a device sensing candidate slots for communication with another device. The device can determine whether to use contiguous partial sensing ("CPS") alone or with periodic-based partial sensing ("PBPS").

A device can use periodic-based partial sensing 302 to determine one or more slots 304 for resources that the device can use during periodic communication with another device. For instance, the device can use one or more resources from the slots 304 to communicate with the other device periodically, e.g., according to a schedule.

When the device receives a resource selection trigger 306 during slot n for an aperiodic communication, the device can determine candidate slots for the communication. Normally, the device would use CPS alone to determine the candidate slots. In FIG. 3, the device can determine whether to use CPS along with PBPS to determine the candidate slots.

For instance, when the device receives the resource selection trigger 306, the device can determine whether PBPS candidate slots 308 identified during the periodic-based partial sensing 302 are at least a first slot gap threshold $T_1$ away from the slot n. The first slot gap threshold $T_1$ can indicate a minimum number of slots required for the device to prepare to use a slot from the PBPS candidate slots 308. When the device determines that the PBPS candidates slots are at least the first slot gap threshold $T_1$ from the slot n, the device can determine to use the PBPS candidate slots 308. This can improve the reliability of the resources identified by the device for the aperiodic communication.

In some implementations, the device can determine whether a quantity of slots in the PBPS candidate slots 308 satisfies, e.g., is greater than or equal to or either, a threshold quantity of slots. If so, the device can determine to use the PBPS candidate slots 308.

When the device determines to use the PBPS candidate slots 308, the device can determine a CPS sensing window 310. The device can determine the start of the CPS sensing window 310 as a slot at a distance of the first slot gap threshold T1 from the start of the PBPS candidate slots 308. The device can determine the end of the CPS sensing window 310 as a slot at a distance of a second slot gap threshold T2 from the start of the PBPS candidate slots. The device can determine the second slot gap threshold T2 using a contiguous partial sensing result processing time, a sidelink transmission preparation time, or both. For instance, the second slot gap threshold T2 can be a sum of the contiguous partial sensing result processing time and the sidelink transmission preparation time.

When the device determines that the start of the PBPS candidate slots 308a is not at least the first slot gap threshold $T_1$ from the slot n, or does not include at least the threshold quantity of slots, the device can determine to use CPS only. For instance, the device can determine a start and an end for a CPS sensing window 312 using the slot n during which the device received the resource selection trigger 306. The device can determine a start for the CPS sensing window 312 as a first predetermined number of slots, e.g., one, from the slot n. The device can determine an end for the CPS sensing window 312 as a second predetermined number of slots, e.g., that is different from the first predetermined number, from the slot n. The device can select the second predetermined number as a value less than or equal to thirty-two, e.g., and greater than zero.

When using only CPS, the device can determine one or more candidate slots in a time window. The device can determine the time window using the slot n, the second predetermined number $T_B$, a contiguous partial sensing result processing time $P_1$, a sidelink transmission preparation time $P_2$, the first slot gap threshold $T_1$, the second slot gap threshold $T_2$, or a combination of two or more of these. For instance, the device can determine the start of the time window $s_1 = n + T_B + P_1 + P_2$. The device can determine the end of the time window $e_1 = n + T_2$. The device can then use the set of slots in the time window as the one or more candidate single-slot resources.

Figure 4:
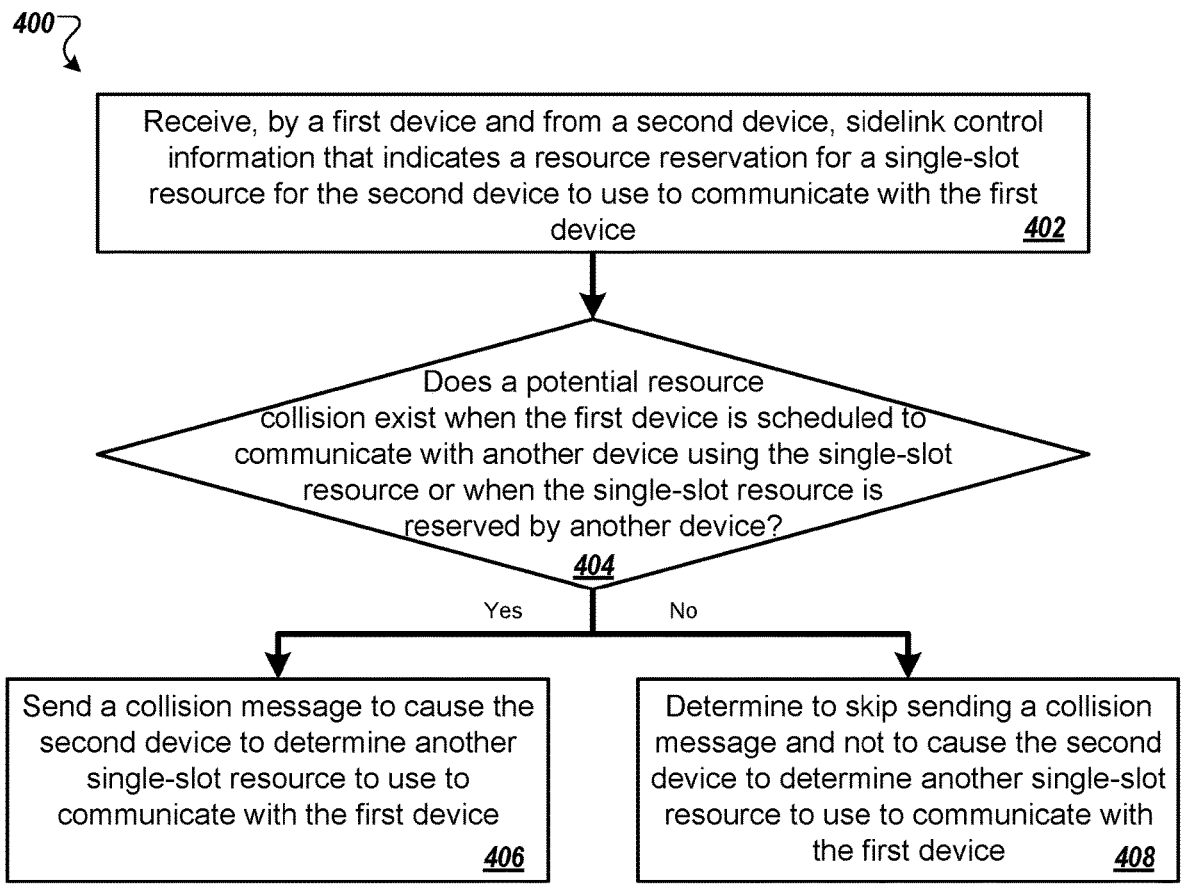
FIG. 4 is a flow diagram of an example process for determining whether a collision exists.

FIG. 4 is a flow diagram of an example process 400 for determining whether a collision exists. For example, the process 400 can be used by any of the devices 102, 104, 110 from the environment 100. Although the process 400 is described with reference to a first device and a second device, these devices need not necessarily be the first device 102 and the second device 104 but can be a different combination of devices from the environment 100.

A first device receives, from a second device, sidelink control information (402). The sidelink control information can indicate a resource reservation for a single-slot resource for the second device to use to communicate with the first device.

The first device determines whether a potential resource collision exists (404). The determination can be based at least in part on the sidelink control information. A potential collision can exist when the first device is scheduled to communicate with another device using the single-slot resource or when the single-slot resource is reserved by another device or both. In some examples, the first device can determine that a potential resource collision exists when a likelihood of a collision satisfies a likelihood threshold.

The first device sends a collision message (406). For instance, in response to determining that a potential collision exists, the first device sends the collision message. Sending the collision message can cause the second device to determine another single-slot resource to use to communicate with the first device.

The first device can send, within the predetermined number of slots from a slot in which the first device received the sidelink control information, the collision message. The first device can send, within the predetermined number of slots from a slot in which a potential resource collision exists according to the received sidelink control information, the collision message. The first device can receive resource pool configuration data or pre-configuration data that identifies the reference slot.

The first device determines to skip sending a collision message (408). For example, by determining to skip sending the collision message, the first device can determine not to cause the second device to determine another single-slot resource to use to communicate with the first device.

In some implementations, the process 400 can include additional steps, fewer steps, or some of the steps can be divided into multiple steps. For example, the process 400 can include one or more steps from the process 500, described below. The process 400 can include step 502, step 504, step 506, or a combination of two or more of these. In some examples, the process 400 includes step 406 and not step 408. In some examples, the process 400 includes step 408 and not step 406. In some implementations, the process 400 need not include step 402, e.g., and can include steps 404 and 406 or steps 404 and 408.

Figure 5:
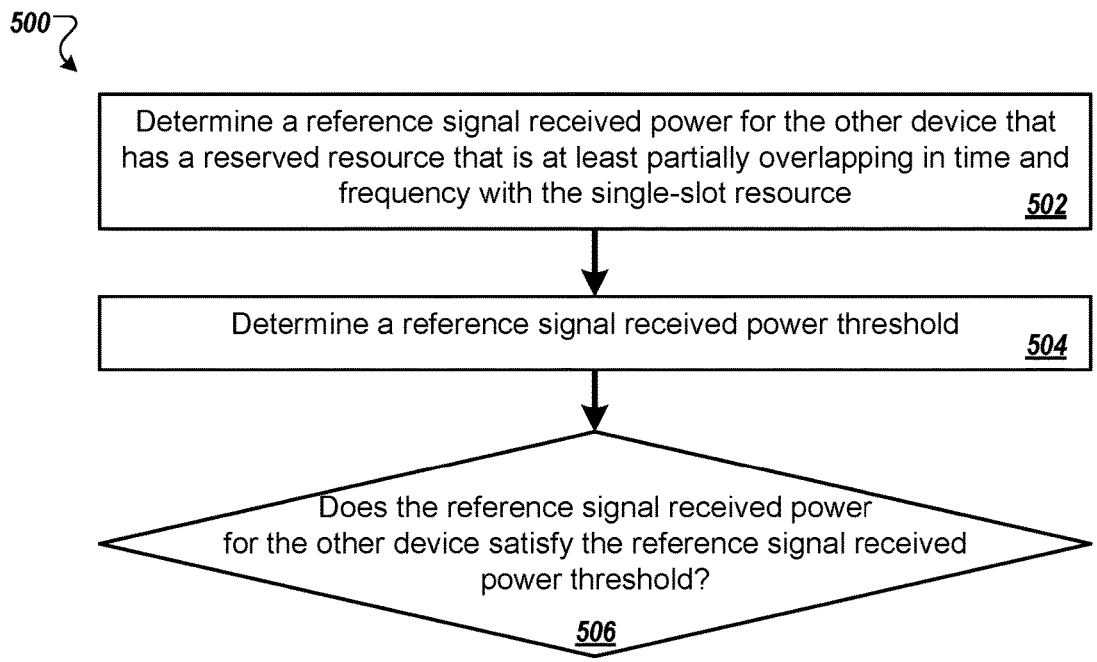
FIG. 5 is a flow diagram of an example process for determining whether a collision exists.

FIG. 5 is a flow diagram of an example process 500 for determining whether a collision exists. For example, the process 500 can be used by any of the devices 102, 104, 110 from the environment 100.

A device determines a reference signal received power for the other device that has a reserved resource that is at least partially overlapping in time and frequency with the single-slot resource (502). The device can use any appropriate component, e.g., a sensor, to determine the reference signal received power.

The device determines a reference signal received power threshold (504). The device can receive resource pool configuration data or pre-configuration data that identifies the reference signal received power threshold. The device can receive sidelink control information that identifies the reference signal received power threshold.

In some examples, the device can determine, as the reference signal received power threshold, a second reference signal received power for a second device, e.g., form which the device received sidelink control information.

The device determines whether the reference signal received power for the other device satisfies the reference signal received power threshold (506). For instance, the device can determine whether the reference signal received power is greater than, equal to, or greater than or equal to the reference signal received power. In some examples, the device can determine whether the reference signal received power is within a threshold distance of the reference signal received power threshold, e.g., when the threshold is the second reference signal received power for the second device.

In some implementations, the process 500 can include additional steps, fewer steps, or some of the steps can be divided into multiple steps. For example, the process 500 can include one or more steps from the process 400, such as step 406 in response to determining that the reference signal received power for the other device satisfies the reference signal received power threshold. The process 500 can include performing step 408 in response to determining that the reference signal received power for the other device does not satisfy the reference signal received power threshold.

FIG. 6 is a flow diagram of an example process 600 for sending a time window message. For example, the process 600 can be used by the first device 202 from the environment 200.

A first device determines a time window that includes a plurality of time slots that can be used to determine a time slot (602). The time slot can be for communication with another device using a single-slot resource on a sidelink communication channel. The time window can be for a sidelink communication channel to communicate with another device using a single-slot resource that has the time slot. The other device can be a second device.

The first device determines a first offset and a second offset that identify the time window with respect to a reference time slot (604). The reference time slot can be a slot with which the first device will send a message, e.g., a slot identification request, to the second device.

The first device sends, during the reference time slot, a message that i) identifies the first offset and the second offset that identify the time window and ii) includes a request for a second device to respond with an identification of one or more time slots in the time window for the single-slot resource (606). The second device can be the other device. In some examples, the second device is a different device from the other device.

In some implementations, the process 600 can include additional steps, fewer steps, or some of the steps can be divided into multiple steps. For example, the process 600 can include steps 604 and 606 without step 602. After sending the message, the device can receive, from the second device, a response that identifies the one or more time slots for the single-slot resource. The second device can determine the one or more time slots using the first offset, the second offset, and data for the reference time slot. The device can then use one of the one or more time slots identified in the response to determine the single-slot resource to communicate with the second device.

Figure 7:
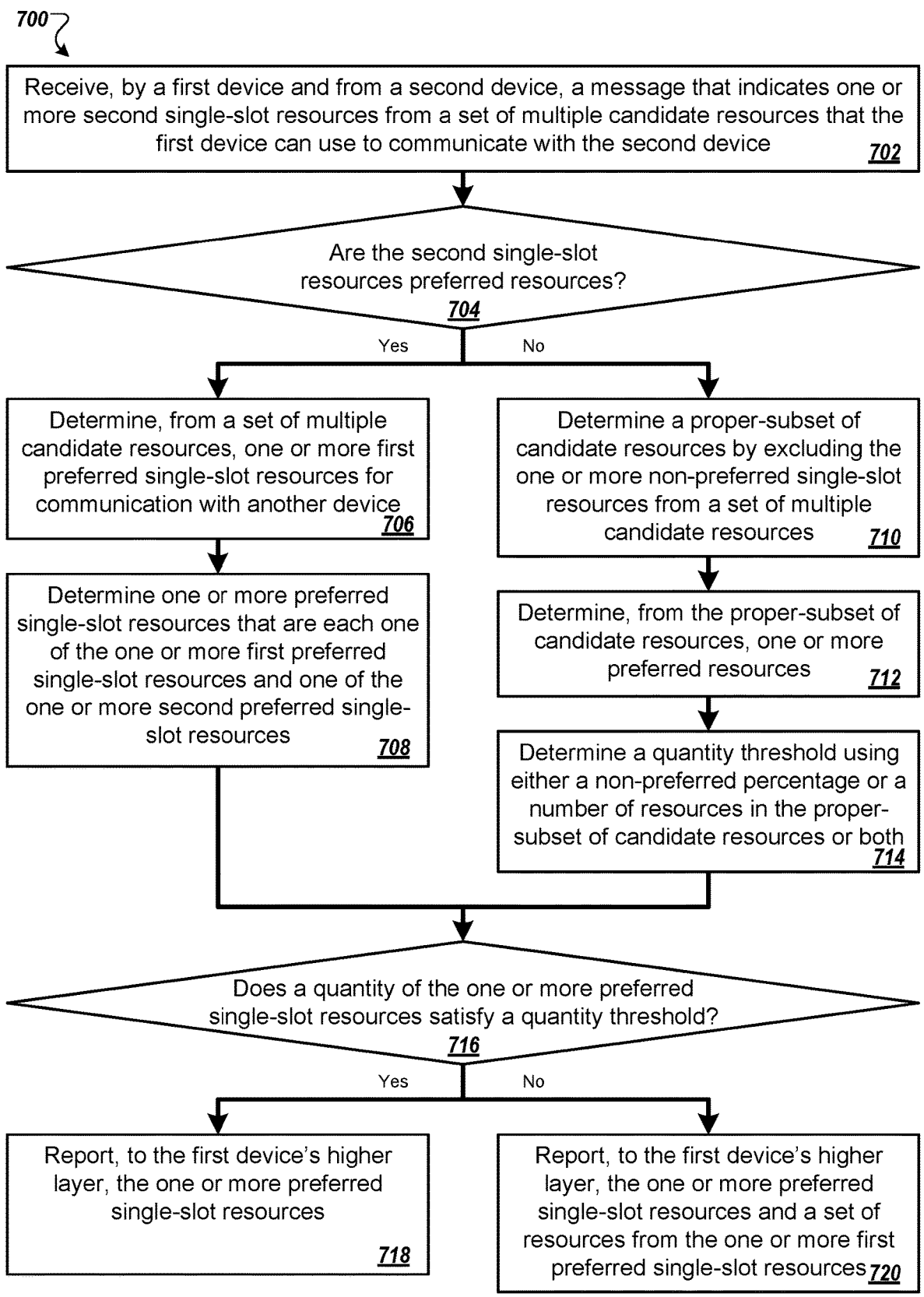
FIG. 7 is a flow diagram of an example process for determining resources for use communicating with another device.

FIG. 7 is a flow diagram of an example process 700 for determining resources for use communicating with another device. For example, the process 700 can be used by the second device 204, e.g., by a lower layer such as a physical layer in the second device, from the environment 200.

A first device receives, from a second device, a message (702). The message can indicate one or more second single-slot resources from a set of multiple candidate resources that the first device can use to communicate with the second device.

The first device determines whether the second single-slot resources are preferred resources (704). For instance, the first device can determine whether data in the message, e.g., a flag, indicates that the second single-slot resources are preferred or non-preferred resources.

The first device determines, from a set of multiple candidate resources, one or more first preferred single-slot resources for communication with another device (706). For example, in response to determining that the second single-slot resources are preferred resources, the first device determines the one or more first preferred single-slot resources. In some examples, the first device can determine the first single-slot resources before receiving the message or determining whether the second single-slot resources are preferred resources.

The first device determines one or more preferred single-slot resources that are each one of the one or more first preferred single-slot resources and one of the one or more second preferred single-slot resources (708). The one or more preferred single-slot resources and be one or more intersected single-slot resources.

The first device determines a proper-subset of candidate resources by excluding the one or more non-preferred single-slot resources from a set of multiple candidate resources (710). For instance, in response to determining that the second single-slot resources are not preferred resources, e.g., are non-preferred resources, the first device determines the proper-subset of candidate resources. The set of multiple candidate resources can include the one or more first preferred single-slot resources. For instance, the first device can determine the proper-subset that includes the one or more first preferred single-slot resources that are not also a non-preferred single-slot resource.

In some implementations, determining the proper-subset can include excluding any candidate single-slot resource from the set of multiple candidate resources that a) a reference signal received power for a sidelink control information is higher than a threshold value, and b) are periodically reserved by another device within the resource selection window.

The first device determines, from the proper-subset of candidate resources, one or more preferred resources (712). For instance, the first device senses one or more first preferred single-slot resources and determines the one or more preferred resources as the resources from the first preferred single-slot resources that are in the proper-subset of candidate resources.

In some implementations, the first device can determine the one or more first preferred single-slot resources. The first device can determine the one or more preferred single-slot resources by excluding the non-preferred single-slot resources from the one or more first preferred resources.

The first device determines a quantity threshold using either a non-preferred percentage or a number of resources in the proper-subset of candidate resources or both (714). In some examples, the first device can configure the quantity threshold per resource pool, using a data priority, or both. The resource pool can be the set of time and frequency resources that can be used for communications with other devices, e.g., for sidelink communications. The data priority can be the prior of the data that will be transmitted, e.g., over the sidelink.

The first device determines whether a quantity of the one or more preferred single-slot resources satisfies a quantity threshold (716). The quantity can be a predetermined quantity. The quantity can be a dynamic quantity, e.g., determined using the non-preferred percentage, the number of resources in the proper-subset, the data priority, per the resource pool, or a combination of two or more of these.

The first device reports, to the first device's higher layer, the one or more preferred single-slot resources (718). For instance, in response to determining that the quantity satisfies the quantity threshold, the first device reports the one or more preferred single-slot resources to the higher layer, e.g., that is above the physical layer.

The first device reports, to the first device's higher layer, the one or more preferred single-slot resources and a set of resources from the one or more first preferred single-slot resources (720). For example, in response to determining that the quantity does not satisfy the quantity threshold, the first device reports the one or more preferred single-slot resources and the set of resources to the higher layer. The set of resources can include the first preferred single-slot resources other than those that are included in the one or more preferred single-slot resources.

The order of steps in the process 700 described above is illustrative only, and determining the resources for use communicating with the other device can be performed in different orders. For example, the process 700 can include performing step 706 before step 704, or before step 702. In some examples, the process 700 can include performing step 714 before step 712.

In some implementations, the process 700 can include additional steps, fewer steps, or some of the steps can be divided into multiple steps. For example, the process 700 can include, after selectively reporting: selecting, by the first device's higher layer, the one or more intersected single-slot resources for communication with the second device, and randomly selecting, by the first device's higher layer, a quantity of resources from the set of resources for communication with the second device. The process 700 can include randomly selecting, by the first device's higher layer and after selectively reporting, a quantity of resources from the one or more intersected single-slot resources for communication with the second device.

In some implementations, when a quantity of the one or more first referred single slot resources does not satisfy a second quantity threshold, the first device can increase a decibel level for a priority value for use sensing one or more other preferred resources. The first device can use the increased decibel level to sense the one or more other preferred resources and repeat one or more steps in the process using the one or more first preferred single-slot resources and the one or more other preferred resources for the set of candidate resources.

Figure 8:
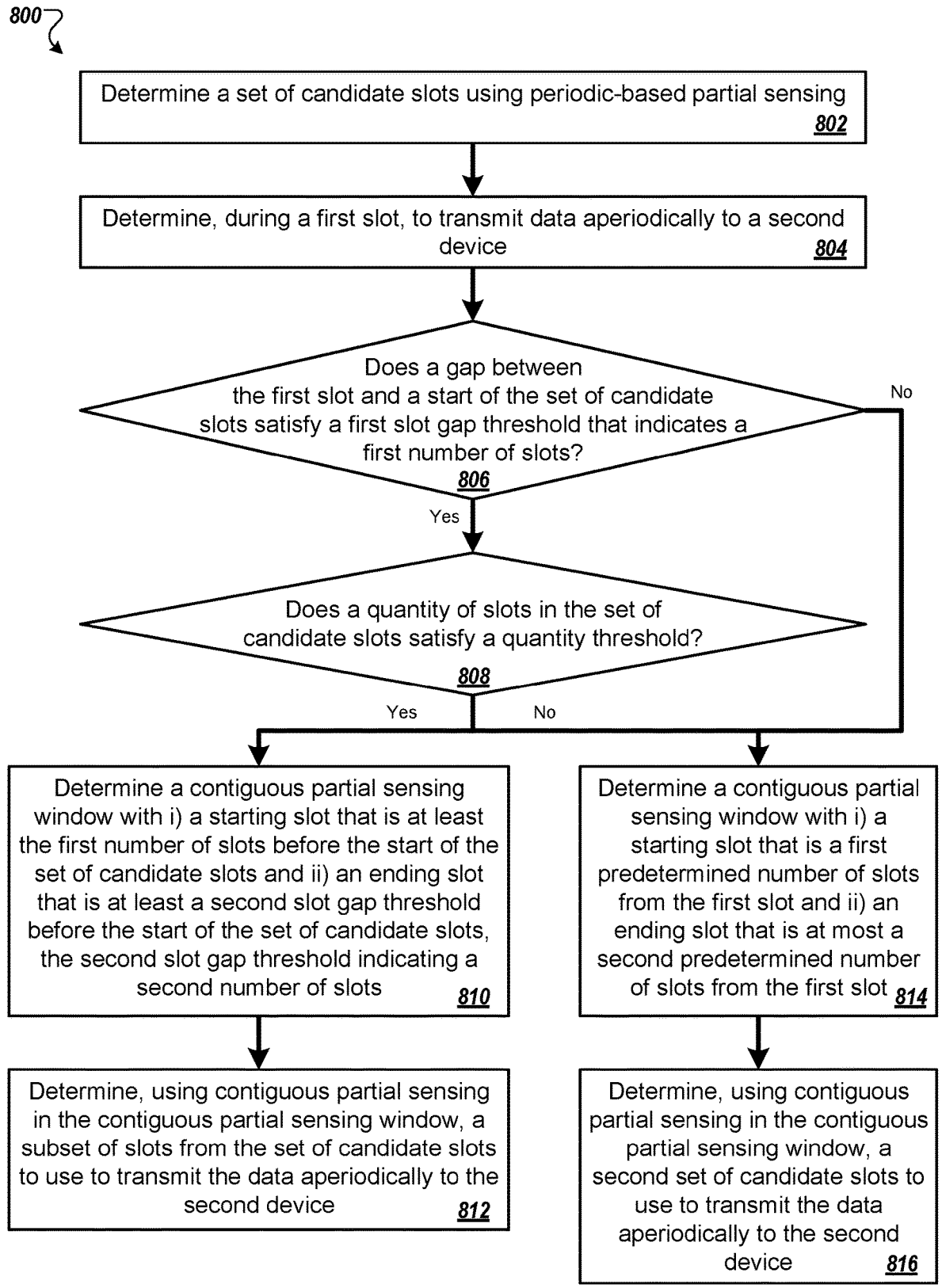
FIG. 8 is a flow diagram of an example process for determining whether to use periodic-based partial sensing for aperiodic communication.

FIG. 8 is a flow diagram of an example process 800 for determining whether to use periodic-based partial sensing for aperiodic communication. For example, the process 800 can be used by the device described with reference to FIG. 3, e.g., any of the devices from the environments 100, 200.

A device determines a set of candidate slots using periodic-based partial sensing (802). For instance, the device uses a sensor with periodic-based partial sensing to determine the set of candidate slots.

The device determines, during a first slot, to transmit data aperiodically to a second device (804). For example, the device receives a message, e.g., from an application executing on the device, that identifies data to aperiodically transmit to the second device.

The device determines whether a gap between the first slot and a start of the set of candidate slots satisfies a first slot gap threshold that indicates a first number of slots (806). If so, the device can proceed to either step 808 or step 810. If not, the device can proceed to step 814.

The device determines whether a quantity of slots in the set of candidate slots satisfies a quantity threshold (808). The device can perform step 808 without performing step 806. In some examples, the device can perform both step 806 and step 808.

The device determines a contiguous partial sensing window (810). For instance, the device can determine the contiguous partial sensing window when the gap satisfies the first slot gap threshold, the quantity of slots satisfies the quantity threshold, or both.

The contiguous partial sensing window can have i) a starting slot that is at least the first number of slots before the start of the set of candidate slots and ii) an ending slot that is at least a second slot gap threshold before the start of the set of candidate slots. The second slot gap threshold can indicate a second number of slots. The first slot gap threshold can be greater than the second slot gap threshold.

The device determines, using contiguous partial sensing in the contiguous partial sensing window, a subset of slots from the set of candidate slots to use to transmit the data aperiodically to the second device (812). The device can use the subset of slots, or a slot from the subset, for communication with the second device.

The device determines a contiguous partial sensing window (814). For instance, the device can determine the contiguous partial sensing window when the gap does not satisfy the first slot gap threshold, the quantity of slots does not satisfy the quantity threshold, or both. The contiguous partial sensing window can have i) a starting slot that is a first predetermined number of slots from the first slot and ii) an ending slot that is at most a second predetermined number of slots from the first slot.

The device determines, using contiguous partial sensing in the contiguous partial sensing window, a second set of candidate slots to use to transmit the data aperiodically to the second device (816). For example, because the device cannot use the set of candidate slots, the device can determine the second set of candidate slots. The device can use one or more slots from the second set of candidate slots to communicate with the second device.

The order of steps in the process 800 described above is illustrative only, and determining whether to use periodic-based partial sensing for aperiodic communication can be performed in different orders. For example, the device can determine to transmit data aperiodically and then determine the set of candidate slots using periodic-based partial sensing.

In some implementations, the process 800 can include additional steps, fewer steps, or some of the steps can be divided into multiple steps. For example, the device can perform step 806 and then step 808. The device can perform steps 806 and 808 substantially concurrently.

Although this specification provides examples that refer to single-slot resources, in some implementations, the systems and methods described in this specification can work with multi-slot resources. For instance, a device can select, or send a collision message for, a two-slot resource.

A number of implementations have been described. Nevertheless, it will be understood that various modifications may be made without departing from the spirit and scope of the disclosure. For example, various forms of the flows shown above may be used, with steps re-ordered, added, or removed.

Figure 9:
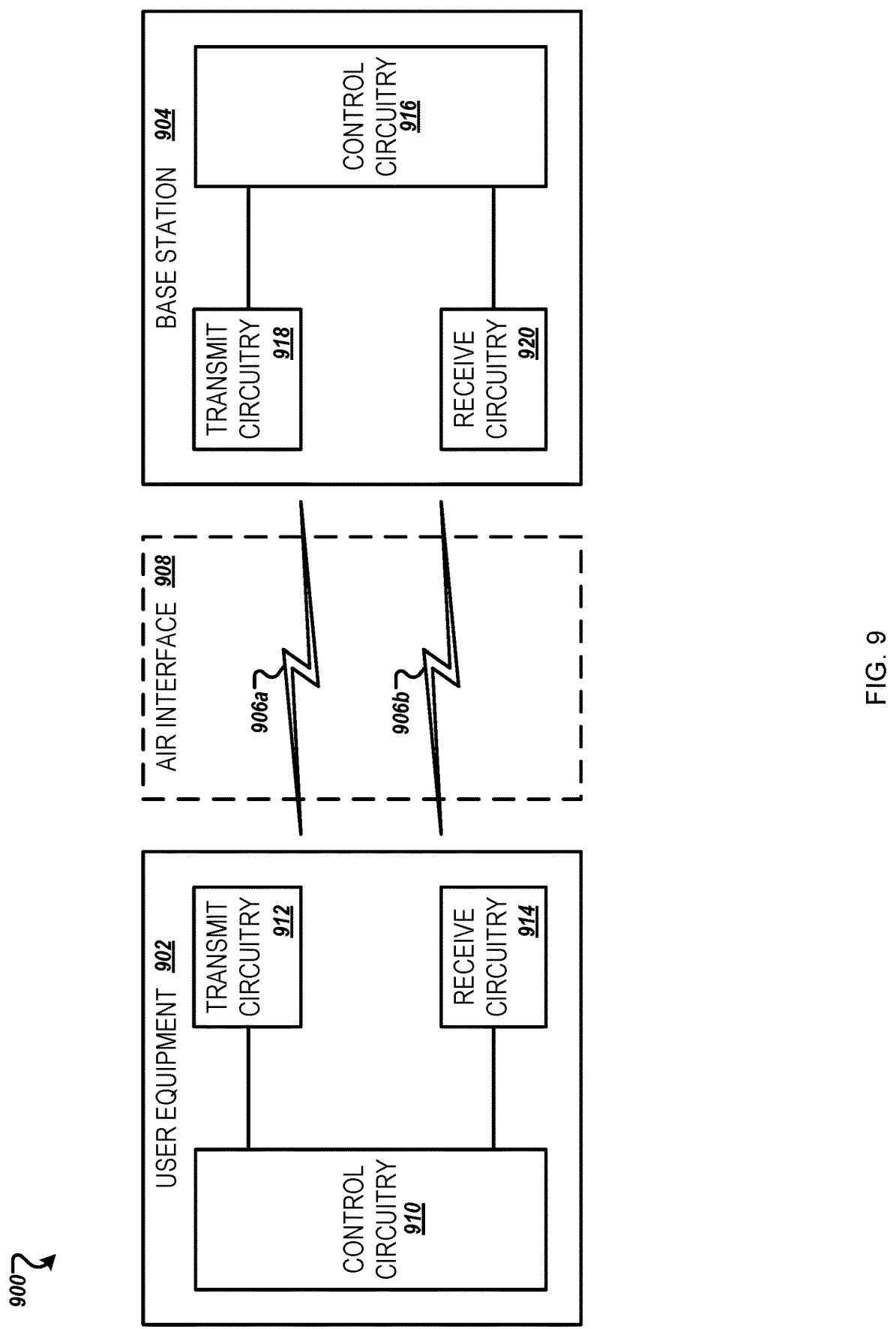
FIG. 9 illustrates a wireless network, according to some implementations.

FIG. 9 illustrates a wireless network 900, according to some implementations. The wireless network 900 includes a UE 902 and a base station 904 connected via one or more channels 906A, 906B across an air interface 908. The UE 902 and base station 904 communicate using a system that supports controls for managing the access of the UE 902 to a network via the base station 904.

In some implementations, the wireless network 900 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 900 may be a E-UTRA (Evolved Universal Terrestrial Radio Access)-NR Dual Connectivity (EN-DC) network, or a NR-EUTRA Dual Connectivity (NE-DC) network. However, the wireless network 900 may also be a Standalone (SA) network that incorporates only 5G NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 900, the UE 902 and any other UE in the system may be, for example, laptop computers, smartphones, tablet computers, machine-type devices such as smart meters or specialized devices for healthcare, intelligent transportation systems, or any other wireless devices with or without a user interface. In network 900, the base station 904 provides the UE 902 network connectivity to a broader network (not shown). This UE 902 connectivity is provided via the air interface 908 in a base station service area provided by the base station 904. In some implementations, such a broader network may be a wide area network operated by a cellular network provider, or may be the Internet. Each base station service area associated with the base station 904 is supported by antennas integrated with the base station 904. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 902 includes control circuitry 910 coupled with transmit circuitry 912 and receive circuitry 914. The transmit circuitry 912 and receive circuitry 914 may each be coupled with one or more antennas. The control circuitry 910 may include various combinations of application-specific circuitry and baseband circuitry. The transmit circuitry 912 and receive circuitry 914 may be adapted to transmit and receive data, respectively, and may include radio frequency (RF) circuitry or front-end module (FEM) circuitry.

In various implementations, aspects of the transmit circuitry 912, receive circuitry 914, and control circuitry 910 may be integrated in various ways to implement the operations described herein. The control circuitry 910 may be adapted or configured to perform various operations such as those described elsewhere in this disclosure related to a UE.

The transmit circuitry 912 can perform various operations described in this specification. Additionally, the transmit circuitry 912 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 912 may be configured to receive block data from the control circuitry 910 for transmission across the air interface 908.

The receive circuitry 914 can perform various operations described in this specification. Additionally, the receive circuitry 914 may receive a plurality of multiplexed downlink physical channels from the air interface 908 and relay the physical channels to the control circuitry 910. The plurality of downlink physical channels may be multiplexed according to TDM or FDM along with carrier aggregation. The transmit circuitry 912 and the receive circuitry 914 may transmit and receive both control data and content data (e.g., messages, images, video, etc.) structured within data blocks that are carried by the physical channels.

FIG. 9 also illustrates the base station 904. In implementations, the base station 904 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 904 that operates in an NR or 5G wireless network 900, and the term "E-UTRAN" or the like may refer to a base station 904 that operates in an LTE or 4G wireless network 900. The UE 902 utilizes connections (or channels) 906A, 906B, each of which includes a physical communications interface or layer.

The base station 904 circuitry may include control circuitry 916 coupled with transmit circuitry 918 and receive circuitry 920. The transmit circuitry 918 and receive circuitry 920 may each be coupled with one or more antennas that may be used to enable communications via the air interface 908. The transmit circuitry 918 and receive circuitry 920 may be adapted to transmit and receive data, respectively, to any UE connected to the base station 904. The transmit circuitry 918 may transmit downlink physical channels includes of a plurality of downlink subframes. The receive circuitry 920 may receive a plurality of uplink physical channels from various UEs, including the UE 902.

In FIG. 9, the one or more channels 906A, 906B are illustrated as an air interface to enable communicative coupling, and can be consistent with cellular communications protocols, such as a GSM protocol, a CDMA network protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UE 902 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Control Channel (PSCCH), a Physical Sidelink Discovery Channel (PSDCH), and a Physical Sidelink Broadcast Channel (PSBCH).

Figure 10:
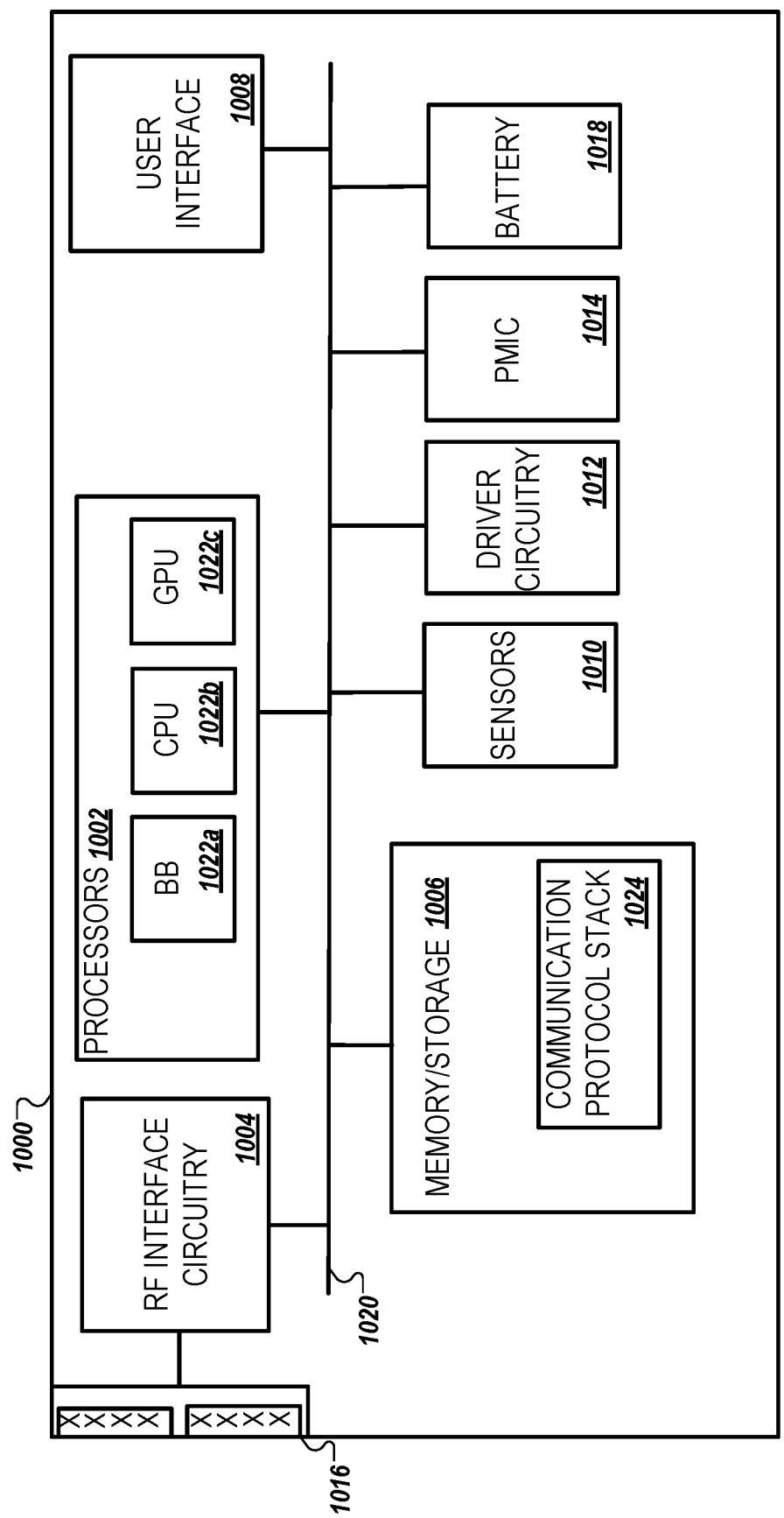
FIG. 10 illustrates a user equipment (UE), according to some implementations.

FIG. 10 illustrates a UE 1000, according to some implementations. The UE 1000 may be similar to and substantially interchangeable with UE 902 of FIG. 9.

The UE 1000 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 1000 may include processors 1002, RF interface circuitry 1004, memory/storage 1006, user interface 1008, sensors 1010, driver circuitry 1012, power management integrated circuit (PMIC) 1014, antenna structure 1016, and battery 1018. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1020, which may represent any type of interface, input/output, bus (local, system, or expansion), transmission line, trace, optical connection, etc. that allows various circuit components (on common or different chips or chipsets) to interact with one another.

The processors 1002 may include processor circuitry such as, for example, baseband processor circuitry (BB) 1022A, central processor unit circuitry (CPU) 1022B, and graphics processor unit circuitry (GPU) 1022C. The processors 1002 may include any type of circuitry or processor circuitry that executes or otherwise operates computer-executable instructions, such as program code, software modules, or functional processes from memory/storage 1006 to cause the UE 1000 to perform operations as described herein.

In some implementations, the baseband processor circuitry 1022A may access a communication protocol stack 1024 in the memory/storage 1006 to communicate over a 3GPP compatible network. In general, the baseband processor circuitry 1022A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 1004. The baseband processor circuitry 1022A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 1006 may include one or more non-transitory, computer-readable media that includes instructions (for example, communication protocol stack 1024) that may be executed by one or more of the processors 1002 to cause the UE 1000 to perform various operations described herein. The memory/storage 1006 include any type of volatile or non-volatile memory that may be distributed throughout the UE 1000. In some implementations, some of the memory/storage 1006 may be located on the processors 1002 themselves (for example, L1 and L2 cache), while other memory/storage 1006 is external to the processors 1002 but accessible thereto via a memory interface. The memory/storage 1006 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1004 may include transceiver circuitry and radio frequency front module (RFEM) that allows the UE 1000 to communicate with other devices over a radio access network. The RF interface circuitry 1004 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1016 and proceed to filter and amplify (with a low-noise amplifier) the signal. The signal may be provided to a receiver of the transceiver that downconverts the RF signal into a baseband signal that is provided to the baseband processor of the processors 1002.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1016. In various implementations, the RF interface circuitry 1004 may be configured to transmit/receive signals in a manner compatible with NR access technologies.

The antenna 1016 may include antenna elements to convert electrical signals into radio waves to travel through the air and to convert received radio waves into electrical signals. The antenna elements may be arranged into one or more antenna panels. The antenna 1016 may have antenna panels that are omnidirectional, directional, or a combination thereof to enable beamforming and multiple input, multiple output communications. The antenna 1016 may include microstrip antennas, printed antennas fabricated on the surface of one or more printed circuit boards, patch antennas, phased array antennas, etc. The antenna 1016 may have one or more panels designed for specific frequency bands including bands in FR1 or FR2.

The user interface 1008 includes various input/output (I/O) devices designed to enable user interaction with the UE 1000. The user interface 1008 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1000.

The sensors 1010 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1012 may include software and hardware elements that operate to control particular devices that are embedded in the UE 1000, attached to the UE 1000, or otherwise communicatively coupled with the UE 1000. The driver circuitry 1012 may include individual drivers allowing other components to interact with or control various input/output (I/O) devices that may be present within, or connected to, the UE 1000. For example, driver circuitry 1012 may include a display driver to control and allow access to a display device, a touchscreen driver to control and allow access to a touchscreen interface, sensor drivers to obtain sensor readings of sensor circuitry 1028 and control and allow access to sensor circuitry 1028, drivers to obtain actuator positions of electro-mechanic components or control and allow access to the electro-mechanic components, a camera driver to control and allow access to an embedded image capture device, audio drivers to control and allow access to one or more audio devices.

The PMIC 1014 may manage power provided to various components of the UE 1000. In particular, with respect to the processors 1002, the PMIC 1014 may control power-source selection, voltage scaling, battery charging, or DC-to-DC conversion.

In some implementations, the PMIC 1014 may control, or otherwise be part of, various power saving mechanisms of the UE 1000. A battery 1018 may power the UE 1000, although in some examples the UE 1000 may be mounted deployed in a fixed location, and may have a power supply coupled to an electrical grid. The battery 1018 may be a lithium ion battery, a metal-air battery, such as a zinc-air battery, an aluminum-air battery, a lithium-air battery, and the like. In some implementations, such as in vehicle-based applications, the battery 1018 may be a typical lead-acid automotive battery.

Figure 11:
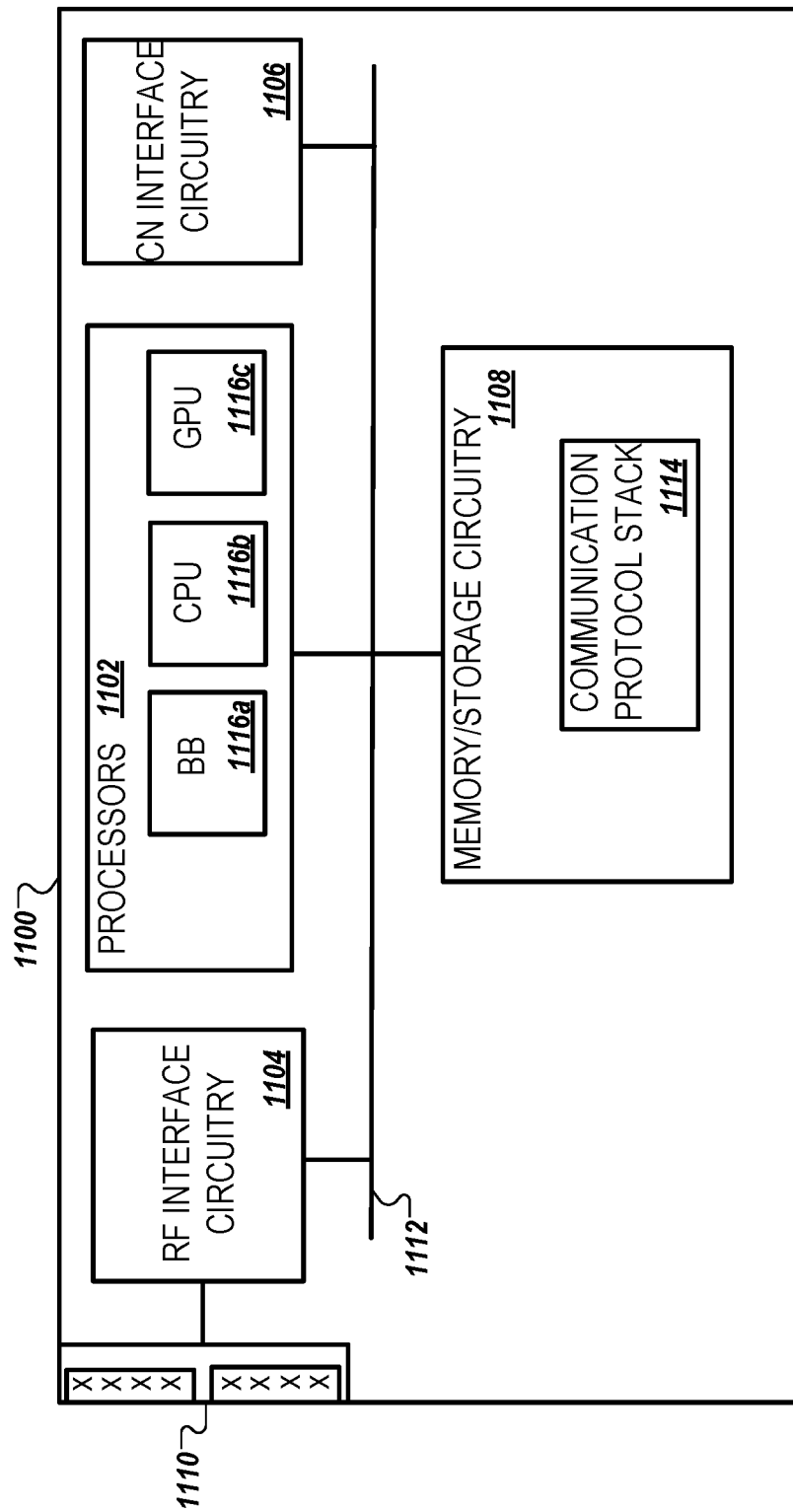
FIG. 11 illustrates an access node, according to some implementations.

FIG. 11 illustrates an access node 1100 (e.g., a base station or gNB), according to some implementations. The access node 1100 may be similar to and substantially interchangeable with base station 904. The access node 1100 may include processors 1102, RF interface circuitry 1104, core network (CN) interface circuitry 1106, memory/storage circuitry 1108, and antenna structure 1110.

The components of the access node 1100 may be coupled with various other components over one or more interconnects 1112. The processors 1102, RF interface circuitry 1104, memory/storage circuitry 1108 (including communication protocol stack 1114), antenna structure 1110, and interconnects 1112 may be similar to like-named elements shown and described with respect to FIG. 10. For example, the processors 1102 may include processor circuitry such as, for example, baseband processor circuitry (BB) 1116A, central processor unit circuitry (CPU) 1116B, and graphics processor unit circuitry (GPU) 1116C.

The CN interface circuitry 1106 may provide connectivity to a core network, for example, a 5th Generation Core network (5GC) using a 5GC-compatible network interface protocol such as carrier Ethernet protocols, or some other suitable protocol. Network connectivity may be provided to/from the access node 1100 via a fiber optic or wireless backhaul. The CN interface circuitry 1106 may include one or more dedicated processors or FPGAs to communicate using one or more of the aforementioned protocols. In some implementations, the CN interface circuitry 1106 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 1100 that operates in an NR or 5G system (for example, a gNB), and the term "E-UTRAN node" or the like may refer to an access node 1100 that operates in an LTE or 4G system (e.g., an eNB). According to various implementations, the access node 1100 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 1100 may be implemented as one or more software entities running on server computers as part of a virtual network, which may be referred to as a CRAN and/or a virtual baseband unit pool (vBBUP). In V2X scenarios, the access node 1100 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:
    receiving, by a first device, resource pool configuration data indicating a reference slot;
    receiving, by the first device and from a second device, sidelink control information that indicates a resource reservation for a single-slot resource for the second device to use to communicate with the first device;
    determining, by the first device and based at least in part on the sidelink control information, whether a potential resource collision exists when the first device is scheduled to communicate with another device using the single-slot resource or when the single-slot resource is reserved by another device; and
    in response to determining that the potential resource collision exists, sending, by the first device to the second device and in a slot determined based on the reference slot indicated by the resource pool configuration data, a collision message to cause the second device to determine another single-slot resource to use to communicate with the first device.

2. The method of claim 1, wherein:
the reference slot comprises a second slot in which the first device received the sidelink control information; and
sending the collision message comprises sending, in the slot based on the second slot in which the first device received the sidelink control information, the collision message.

3. The method of claim 1, wherein:
the reference slot comprises a second slot in which a potential resource collision exists; and
sending the collision message comprises sending, in the slot based on the second slot in which a potential resource collision exists according to the received sidelink control information, the collision message.

4. The method of claim 1, wherein sending the collision message comprises sending an inter-device coordination message.

5. The method of claim 1, wherein:
the slot based on the reference slot comprises a slot three or fewer slots from the reference slot; and
sending the collision message comprises sending, within three or fewer slots from the reference slot, the collision message to cause the second device to determine another single-slot resource to use to communicate with the first device.

6. The method of claim 1, comprising:
receiving, by the first device and from a third device, a second sidelink control information that indicates a second resource reservation for a second single-slot resource for the third device to use to communicate with the first device;
after receiving the second sidelink control information, determining, by the first device, whether a potential resource collision exists when the first device is scheduled to communicate with another device using the second single-slot resource; and
in response to determining that a potential resource collision does not exist, determining, by the first device and within a predetermined number of slots from another reference slot, to skip sending a collision message.

7. The method of claim 6, wherein the second device comprises the third device.

8. The method of claim 1, wherein receiving the resource pool configuration data indicating the reference slot comprises receiving, by the first device, sidelink resource pool configuration data indicating the reference slot.

9. The method of claim 1, wherein receiving the resource pool configuration data indicating the reference slot comprises receiving, by the first device, the resource pool configuration data indicating the reference slot with a value selected from a group comprising a) a first value when the reference slot is a slot in which the first device received the sidelink control information or b) a second value when the reference slot is a slot in which a potential resource collision exists.

10. A method comprising:
receiving, by a first device, resource pool configuration data indicating a reference slot;
receiving, by the first device and from a second device, sidelink control information that indicates a resource reservation for a single-slot resource for the second device to use to communicate with the first device;
after receiving the sidelink control information, determining, by the first device, a reference signal received power for a third device that has a reserved resource that is at least partially overlapping in time and frequency with the single-slot resource;
determining, by the first device, whether the reference signal received power for the third device satisfies a reference signal received power threshold for the third device; and
in response to determining that the reference signal received power for the third device satisfies the reference signal received power threshold for the third device, sending, by the first device to the second device and in a slot determined based on the reference slot indicated by the resource pool configuration data, a collision message to cause the second device to determine another single-slot resource to use to communicate with the first device.

11. The method of claim 10, wherein:
the reference signal received power threshold comprises a second reference signal received power for the second device,
the method comprising determining the second reference signal received power for the second device before determining whether the reference signal received power for the third device satisfies the reference signal received power for the second device.

12. The method of claim 11, wherein determining whether the reference signal received power for the third device satisfies the reference signal received power for the second device comprises determining whether the reference signal received power for the third device is within a power level threshold of the reference signal received power for the second device.

13. The method of claim 10, wherein the reference signal received power threshold comprises a predetermined reference signal received power threshold.

14. The method of claim 10, wherein receiving the sidelink control information comprises receiving the sidelink control information that identifies the reference signal received power threshold.

15. The method of claim 10, wherein determining whether the reference signal received power for the third device satisfies the reference signal received power threshold comprises determining whether the reference signal received power for the third device is greater than, equal to, or greater than or equal to, the reference signal received power threshold.

16. An apparatus comprising one or more processors configured to perform operations comprising:
receiving resource pool configuration data indicating a reference slot;
receiving, from a second device, sidelink control information that indicates a resource reservation for a single-slot resource for the second device to use to communicate with the apparatus;
determining, based at least in part on the sidelink control information, whether a potential resource collision exists when the apparatus is scheduled to communicate with another device using the single-slot resource or when the single-slot resource is reserved by another device; and
in response to determining that the potential resource collision exists, sending, to the second device, a collision message in a slot determined based on the reference slot indicated by the resource pool configuration data and that causes the second device to determine another single-slot resource to use to communicate with the apparatus.

17. The apparatus of claim 16, wherein:
the reference slot comprises a second slot in which the apparatus received the sidelink control information; and
sending the collision message comprises sending, in the slot based on the second slot in which the apparatus received the sidelink control information, the collision message.

18. The apparatus of claim 16, wherein:
the reference slot comprises a second slot in which a potential resource collision exists; and
sending the collision message comprises sending, in the slot based on the second slot in which a potential resource collision exists according to the received sidelink control information, the collision message.

19. The apparatus of claim 16, wherein sending the collision message comprises sending an inter-device coordination message.

20. The apparatus of claim 16, the operations comprising:
receiving, from a third device, a second sidelink control information that indicates a second resource reservation for a second single-slot resource for the third device to use to communicate with the apparatus;
after receiving the second sidelink control information, determining whether a potential resource collision exists when the apparatus is scheduled to communicate with another device using the second single-slot resource; and
in response to determining that a potential resource collision does not exist, determining, within a predetermined number of slots from another reference slot, to skip sending a collision message.

* * * * *